US005768532A

United States Patent [19]

Megerian

[11] Patent Number: 5,768,532
[45] Date of Patent: Jun. 16, 1998

[54] METHOD AND DISTRIBUTED DATABASE FILE SYSTEM FOR IMPLEMENTING SELF-DESCRIBING DISTRIBUTED FILE OBJECTS

[75] Inventor: Mark Gregory Megerian, Rochester, Minn.

[73] Assignee: International Business Machines Corporation, Armonk, N.Y.

[21] Appl. No.: 664,706

[22] Filed: Jun. 17, 1996

[51] Int. Cl.[6] .................................................. G06F 12/00
[52] U.S. Cl. .................... 395/200.75; 370/409; 707/103; 707/104; 395/200.31
[58] Field of Search .................... 395/220.31, 200.47, 395/133, 62, 200.75; 711/216; 707/10, 103, 104; 370/409

[56] References Cited

U.S. PATENT DOCUMENTS

| 5,301,337 | 4/1994 | Wells et al. ............................. 395/800 |
| 5,371,675 | 12/1994 | Greif et al. ............................. 364/419.1 |
| 5,381,534 | 1/1995 | Shi ............................................ 395/200.33 |
| 5,542,078 | 7/1996 | Martel et al. ............................. 395/600 |
| 5,551,027 | 8/1996 | Choy et al. ............................. 395/600 |
| 5,581,760 | 12/1996 | Atkinson et al. ....................... 395/700 |
| 5,687,363 | 11/1997 | Oulid-Aissa et al. .................. 395/604 |
| 5,701,462 | 12/1997 | Whitney et al. ......................... 395/610 |

FOREIGN PATENT DOCUMENTS

| 522488 | 1/1993 | European Pat. Off. |
| WO96/07149 | 3/1996 | WIPO |

*Primary Examiner*—Mehmet B. Geckil
*Attorney, Agent, or Firm*—Joan Pennington

[57] ABSTRACT

A method and apparatus are provided for implementing self-describing file objects. A node group is created for defining multiple computer systems for storing data. A hash algorithm for applying to data records is identified. A partition distribution map for distributing data to each of the multiple computer systems utilizing a set of predetermined hash algorithm results and remote system information for each of the multiple computer systems are identified. A file object is created in each of the multiple computer systems. Each the file objects includes the hash algorithm, the partition distribution map, and the remote system information. A data record is inserted into one of the distributed file objects by receiving the data record, applying the hash algorithm to the received data record, comparing the hash algorithm result with the partition distribution map to identify the particular computer system for the data record, utilizing the system information to establish connection to that system. The file objects are fully self-describing, eliminating the need for additional objects to be addressed, opened, paged into memory or the like.

16 Claims, 4 Drawing Sheets

METHOD AND DISTRIBUTED DATABASE FILE SYSTEM FOR IMPLEMENTING SELF-DESCRIBING DISTRIBUTED FILE OBJECTS

FIELD OF THE INVENTION

The present invention relates to a distributed database file system and method for implementing self-describing file objects.

DESCRIPTION OF THE PRIOR ART

Several known distributed database, or parallel database implementations exist. In known implementations, external constructs must be accessed for operations including hashing, communications information and partitioning. When implementing a distributed database file, or any object that spans multiple systems, there is a need for each piece of the distributed object to have information about the other pieces. In the instance of a distributed database file, each system must have information about the other systems that the file is distributed across, as well as have information about how the data itself is partitioned. If a piece of the distributed file is accessed, and the user wants to retrieve all of the data in the entire distributed file, then the local system has to determine which remote systems to access in order to retrieve all the data. Furthermore, when data is inserted into the file, the file needs to know the partitioning scheme for the data, in order to determine where to store the newly inserted data.

A need exists for an improved method for implementing a distributed database, or any cross-system file object.

SUMMARY OF THE INVENTION

An important object of the present invention is to provide an improved method and apparatus for implementing self-describing file objects.

In brief, a method and apparatus are provided for implementing self-describing file objects. A node group is created for defining multiple computer systems for storing data. A hash algorithm for applying to data records is identified. A partition distribution map for distributing data to each of the multiple computer systems utilizing a set of predetermined hash algorithm results and remote system information for each of the multiple computer systems are identified. A file object is created in each of the multiple computer systems. Each the file objects includes the hash algorithm, the partition distribution map, and the remote system information.

In accordance with a feature of the invention, a data record is inserted into one of the distributed file objects by receiving the data record, applying the hash algorithm to the received data record, comparing the hash algorithm result with the partition distribution map to identify the particular computer system for the data record, and utilizing the system information to establish connection to that system. The file objects are fully self-describing eliminating the need for additional objects to be addressed, opened, paged into memory or the like.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
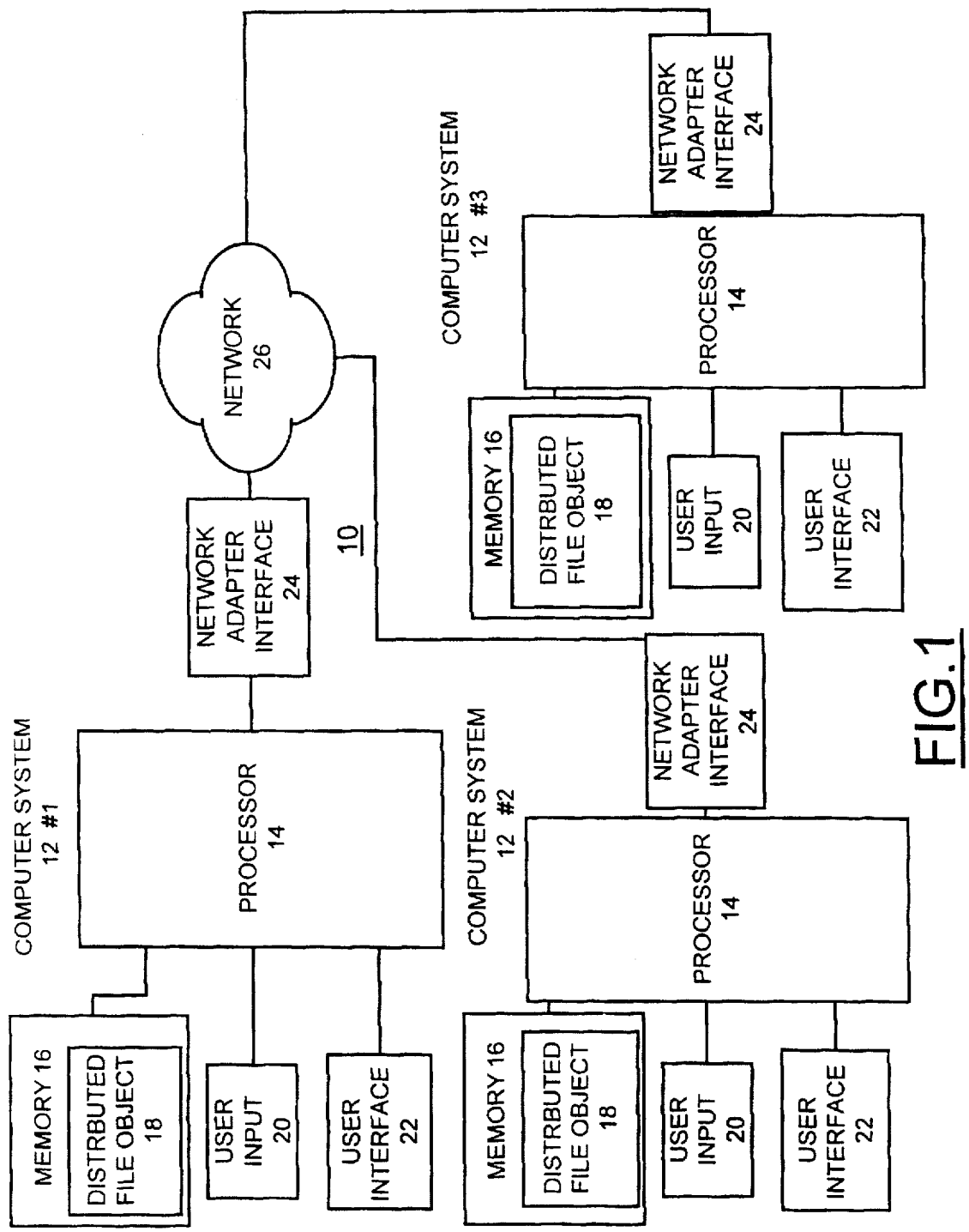
FIG. 1 is a block diagram representation of a computer or data processing system of the preferred embodiment.

Having reference now to the drawings, in FIG. 1 there is shown a distributed computer or data processing system of the preferred embodiment generally designated by the reference character 10. Distributed computer system 10 includes multiple computer systems 12 labeled #1, #2, and #3, as shown in FIG. 1. Each computer system 12 includes a processor 14, a memory 16 containing a distributed file object 18 of the preferred embodiment, a user input 20, a user interface 22 and a network adapter interface 24. The multiple computer systems 12 are connected to a network 26 via the network adapter interface 24.

In accordance with the preferred embodiment, the database file or distributed file object 18 is arranged for storing data portions distributed over the multiple computer systems 12. Each distributed file object 18 contains enough information to locate all of the other distributed file objects 18. A method of the preferred embodiment for locating data uses a hashing algorithm and predetermined partitioning data. The distributed file objects 18 themselves are fully self-describing and eliminate the need for any additional descriptive or operational information.

In the distributed computer system 10, each of the multiple computer systems 12 can be implemented with various different commercially available computers, such as an IBM PS/2 including a storage file system. Also other types of computer system, whether it be another microcomputer such as an Apple Macintosh, a minicomputer such as an IBM System/390, or a microcomputer connected to a larger computer system such as an IBM AS/400 can be used for any of the multiple computer systems 12 and fall within the spirit and scope of this invention. It should be understood that the computer system 10 includes multiple computer systems 12 with the communication network 26 defined by an local area network, a wide area network, or other communication network between the multiple computer systems 12.

Figure 2:
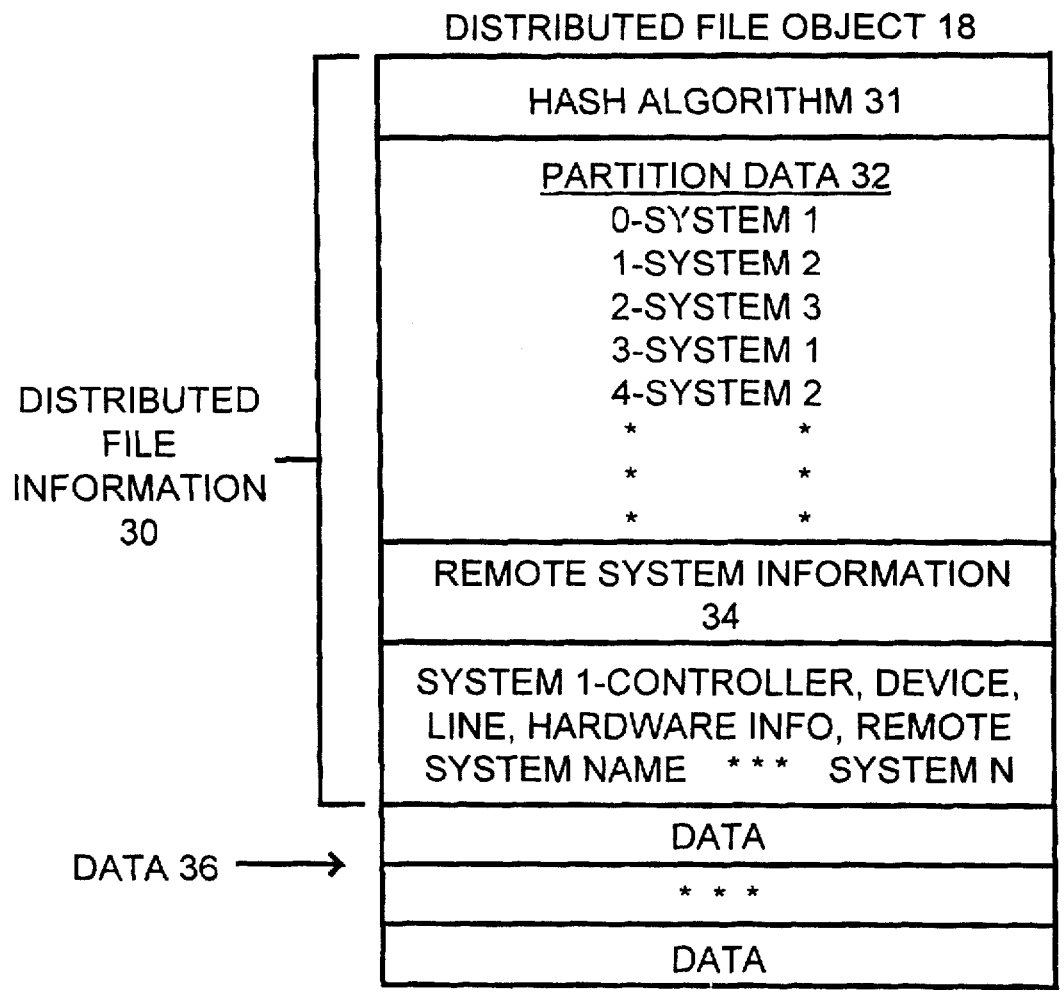
FIG. 2 is a block diagram representation illustrating a distributed file object of the preferred embodiment.

Having reference to FIG. 2, each distributed file object 18 contains a hash algorithm 31 that is applied to new data to determine its hash value and a partitioning scheme or partitioning data 32 that correlates each of possible hash values to a specific one of the systems 12. The hash algorithm 31 is generated in the file object 18 at creation time of the file object 18 and can be customized for the specific attributes of the file's data types. The hash algorithm 31 yields a hash value, which is simply a number from a predefined set of possible numbers. The partitioning data 32 that is stored in each file object 18 is an array of values that maps each of the possible hash values to one of the systems 12 that will hold a portion of the distributed file data 36. Each distributed file object 18 contains communications information 34 for each of the remote systems across which the distributed file object 18 is distributed. Each distributed file object 18 is complete entity. There is no dependency on related objects on the systems 12 that perhaps could get destroyed, corrupted or get out of synch. Everything needed is in the file. There is also the secondary benefit of performance. Once the file is addressed, there is no need for additional objects to be addressed, accessed, opened, paged into memory, or the like. Each of the distributed file objects 18 contain data 36 that is allocated to the different computer systems 12 #1, #2, and #3 in accordance with the partition data 32.

Figure 3:
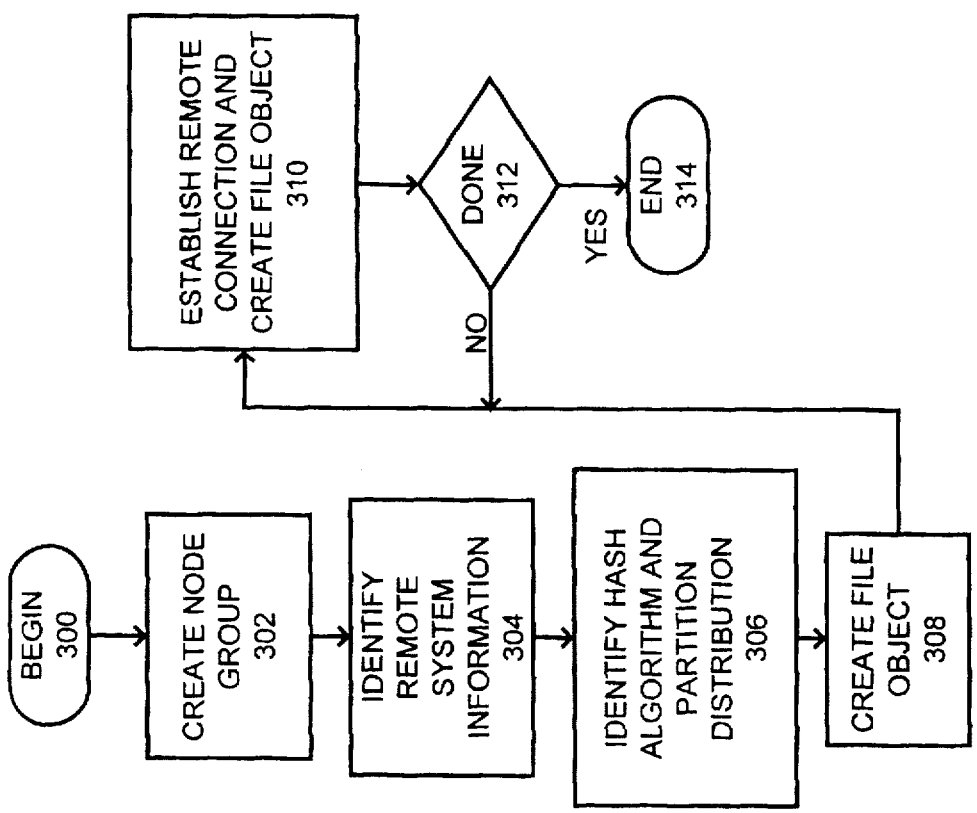
FIGS. 3 and 4 are logic flow diagrams illustrating the method and apparatus of the preferred embodiment.

Referring now to FIG. 3, the sequential operations performed by processor 14 of one of the computer systems 12 to create the distributed file object 18 begin as indicated at a block 300 with creating a node group as indicated at a block 302. Remote system information is identified for each of the multiple computers systems 12 #1, #2, and #3, as shown in FIG. 1, as indicated at a block 304. A hash algorithm 31 to be used for the file object 18 and a partition distribution 32 for partitioning data among each of the multiple computers systems 12 are identified as indicated at a block 306. Various partitioning schemes can be used for partitioning data, for example, a default partitioning scheme can provide an even distribution of data among each of the computer systems. Alternatively, a user specified partitioning scheme can provide a selected percentage for particular ones of the computer systems 12, such as 50% of the data to be stored on computer system 12 #1 and 25% of the data on each of computer systems 12 #2 and #3. A file object is created and stored on the particular one of the computer systems 12 as indicated at a block 308. The file object contains the hash algorithm 31, partition distribution 32, and remote system information 34. A remote connection is established to another one of the multiple computer systems 12 and the file object is created on that particular system 12 as indicated at a block 310. Checking for other of the multiple computer systems 12 that have not been accessed is provided as indicated at a block 312. A next remote connection is established to another one of the multiple computer systems 12 and the file object is created on that particular system 12 until the file object has been created on all the computer systems 12.

Figure 4:
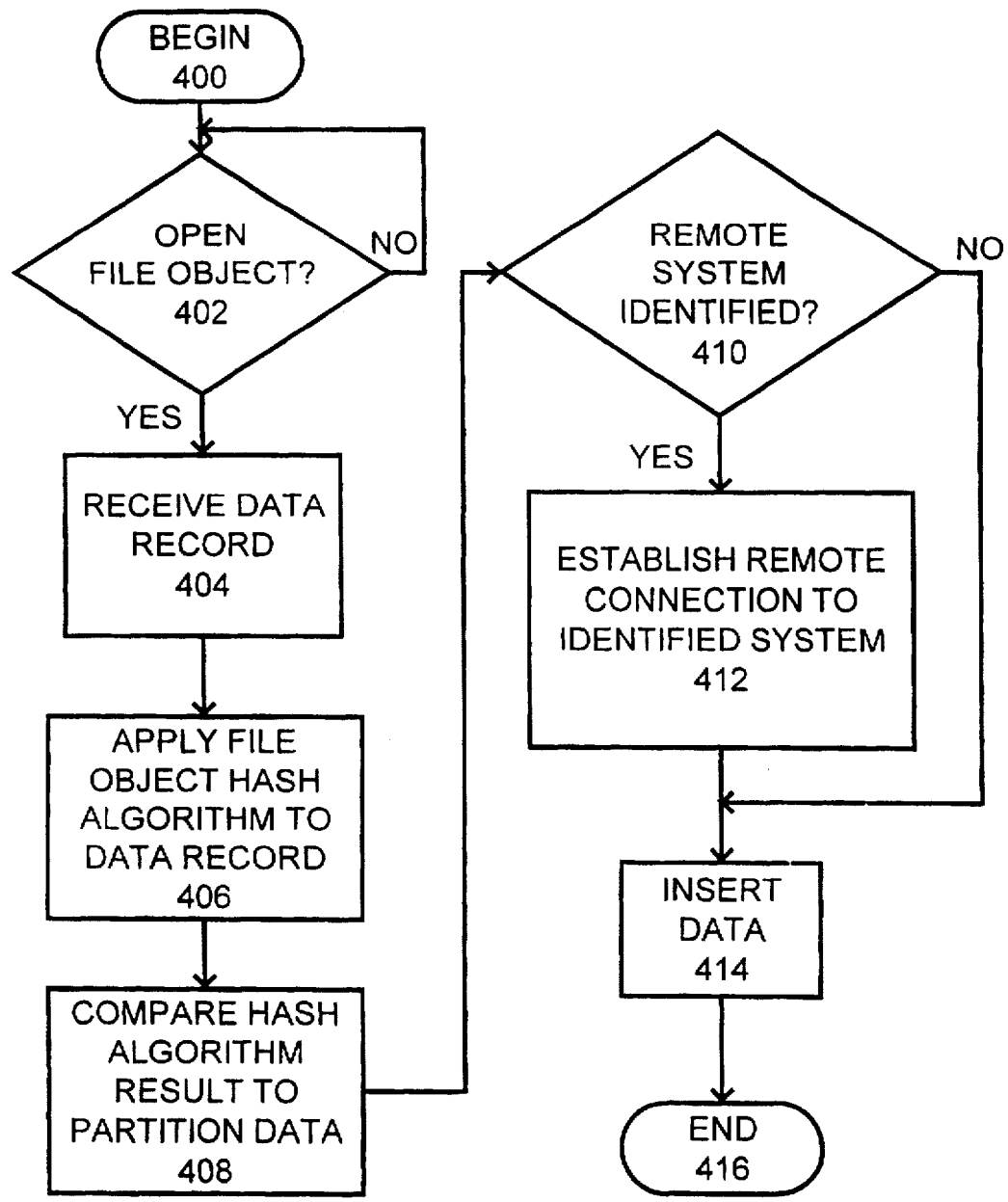

Referring to FIG. 4, the sequential operations performed by processor 14 of one of the computer systems 12 begin as indicated at a block 400 with opening the distributed file object 18 as indicated at a decision block 402. A data record to be stored is received as indicated at a block 404. The hash algorithm 31 is applied to the received data as indicated at a block 406. Then the hash algorithm result is compared with the partition data 32 as indicated at a block 408. A remote system can be identified as indicated at a decision block 410. When a remote system is identified at block 410, then a connection to the identified system is established as indicated at a block 412. The data record 36 is inserted in the particular remote system as indicated at a block 414. Otherwise, when a remote system is not identified at block 410, then data record is inserted in the system that received the data record at block 414 to complete the operations as indicated at a block 416.

The result of this implementation is that when the distributed file object 18 is opened, and the user wants all the data, all of the remote distributed file objects 18 can immediately opened as well as the local distributed file object 18. Also, there is a very simple process involved, since the information is self-contained in the distributed file object 18. At open time, the open process knows that the file is a distributed object file 18, and can quickly find the communications information 34 needed to establish the remote connections. No other objects or external constructs need to be accessed in order to establish the remote connections. Another benefit results when data is added to the file object 18, or data is updated in the file object because the hash algorithm 31 applied to the new data is stored in each file object 18. Again, the entire process can be handled without accessing external programs, external catalogs, or any other objects that describe this hashing information. Also, the above process works in reverse, when querying the file for specific values. When the user is querying for specific data, the hash algorithm 31 is applied to the desired data, and the hash result is compared to the partitioning data 32 to immediately identify which system 12 #1, #2, or #3 contains that data. Note that this can only be done when the user has provided a search predicate that involves a test for equality.

Figure 5:
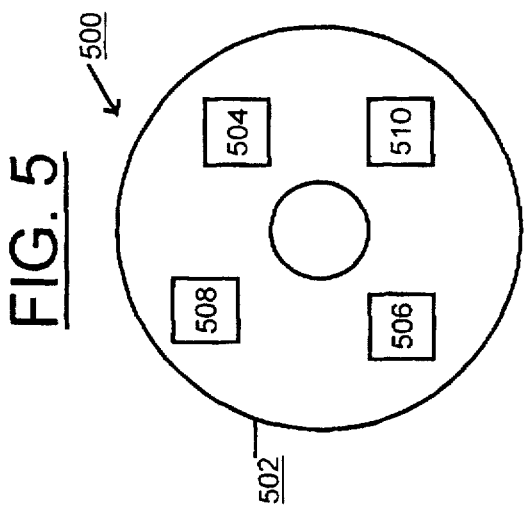
FIG. 5 a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods of the preferred embodiment in the system 10 of FIG. 1.

A sequence of program instructions or a logical assembly of one or more interrelated modules defined by the recorded program means 504, 506, 508, 510, direct the computer systems 12 for implementing self-describing file objects of the preferred embodiment.

While the present invention has been described with reference to the details of the embodiments of the invention shown in the drawing, these details are not intended to limit the scope of the invention as claimed in the appended claims.

What is claimed is:

1. A method for implementing self-describing file objects comprising the steps of:

creating a node group to define multiple computer systems for storing the file object;

identifying a hash algorithm for applying to data records;

identifying a partition distribution map for distributing data to each of said multiple computer systems utilizing a set of predetermined hash algorithm results;

identifying remote system information for each of said multiple computer systems; and creating a file object in each of said multiple computer systems; each said file object including said hash algorithm, said partition distribution map, and said remote system information.

2. A method for implementing self-describing file objects as recited in claim 1 wherein said step of creating a file object in each of said multiple computer systems; each said file object including said hash algorithm, said partition distribution map, and said remote system information includes the steps of establishing a connection to each remote computer system and storing said file object in each said remote computer system.

3. A method for implementing self-describing file objects as recited in claim 1 wherein said step of identifying said partition distribution map includes the steps of utilizing a set of possible hash values for said identified hash algorithm and providing an equal distribution of said possible hash values to said multiple computer systems.

4. A method for implementing self-describing file objects as recited in claim 1 wherein said step of identifying said partition distribution map includes the steps of utilizing a set of possible hash values for said identified hash algorithm and providing a user selected distribution of said possible hash values to said multiple computer systems.

5. A method for implementing self-describing file objects as recited in claim 1 further includes the steps of receiving a data record; applying said hash algorithm to said received data record to generate a hash algorithm result; comparing said hash algorithm result with said partition distribution map to identify one of said multiple computer systems; and inserting said received data record into said file object of said identified computer system.

6. A method for implementing self-describing file objects as recited in claim 5 includes the step of establishing a connection to said identified computer system utilizing said remote system information.

7. Apparatus for implementing self-describing file objects comprising:

means for creating a node group to define multiple computer systems for storing the file object;

identifying a hash algorithm for applying to data records;

means for identifying a partition distribution map for distributing data to each of said multiple computer systems utilizing a set of predetermined hash algorithm results;

means for identifying remote system information for each of said multiple computer systems; and means for creating a file object in each of said multiple computer systems; each said file object including said hash algorithm, said partition distribution map, and said remote system information.

8. Apparatus for implementing self-describing file objects as recited in claim 7 wherein said means for means for creating said file object in each of said multiple computer systems includes means for establishing a connection to each remote computer system and for storing said file object in each said remote computer system.

9. Apparatus for implementing self-describing file objects as recited in claim 7 further includes means for receiving user selections and wherein said means for identifying said partition distribution map for distributing data to each of said multiple computer systems utilizing said set of predetermined hash algorithm results is responsive to said user selections to define said partition distribution map.

10. Apparatus for implementing self-describing file objects as recited in claim 7 wherein said means for identifying said partition distribution map for distributing data to each of said multiple computer systems utilizing said set of predetermined hash algorithm results includes means for providing an equal distribution of said predetermined hash values to said multiple computer systems.

11. Apparatus for implementing self-describing file objects as recited in claim 7 further includes means for receiving a data record; means for applying said hash algorithm to said received data record to generate a hash algorithm result; means for comparing said hash algorithm result with said partition distribution map to identify one of said multiple computer systems.

12. Apparatus for implementing self-describing file objects as recited in claim 11 further includes means for inserting said received data record into said file object of said identified computer system.

13. Apparatus for implementing self-describing file objects as recited in claim 11 further includes means for identifying a remote computer system, means for establishing a connection to said remote computer system and means for inserting said received data record into said file object of said identified remote computer system.

14. A computer program product for use in a multiple computer system, each computer system having a processor, a memory, and a network adapter, the computer program product comprising:

a record medium;

means, recorded on said recording medium, for creating a node group to define multiple computer systems for storing the file object;

means, recorded on said recording medium, for identifying a hash algorithm for applying to data records;

means, recorded on said recording medium, for identifying a partition distribution map for distributing data to each of said multiple computer systems utilizing a set of predetermined hash algorithm results;

means, recorded on said recording medium, for identifying remote system information for each of said multiple computer systems; and means, recorded on said recording medium, for creating a file object in each of said multiple computer systems; each said file object including said hash algorithm, said partition distribution map, and said remote system information.

15. A computer program product as recited in claim 14 wherein said means, recorded on said recording medium, for creating said file object in each of said multiple computer systems includes means, recorded on said recording medium, for establishing a connection to each remote computer system and, for storing said file object in each of said multiple computer systems.

16. A computer program product as recited in claim 14 further includes means, recorded on said recording medium, for receiving a data record; means, recorded on said recording medium, for applying said hash algorithm to said received data record to generate a hash algorithm result; means, recorded on said recording medium, for comparing said hash algorithm result with said partition distribution map to identify one of said multiple computer systems; and means, recorded on said recording medium, for inserting said data record into said file object of said identified computer system.

* * * * *